(12) United States Patent
Lin

(10) Patent No.: US 7,396,233 B2
(45) Date of Patent: Jul. 8, 2008

(54) DISPLAY

(75) Inventor: Kuan-Hsu Lin, Taipei County (TW)

(73) Assignee: QISDA Corporation, Taoyuan (TW)

( * ) Notice: Subject to any disclaimer, the term of this patent is extended or adjusted under 35 U.S.C. 154(b) by 0 days.

(21) Appl. No.: 11/610,455

(22) Filed: Dec. 13, 2006

(65) Prior Publication Data

US 2007/0134966 A1 Jun. 14, 2007

(30) Foreign Application Priority Data

Dec. 14, 2005 (TW) .............................. 94144247 A

(51) Int. Cl.
*H01R 39/00* (2006.01)
(52) U.S. Cl. ........................................ 439/31; 248/923
(58) Field of Classification Search .................. 439/31, 439/165; 248/917, 920–923
See application file for complete search history.

(56) References Cited

U.S. PATENT DOCUMENTS

| 4,516,508 | A | * | 5/1985 | Kako et al. ..................... 108/7 |
| 4,693,444 | A | * | 9/1987 | Williams et al. ............ 248/653 |
| 4,960,256 | A | * | 10/1990 | Chihara et al. ........... 248/286.1 |
| 6,485,209 | B2 | * | 11/2002 | Oura et al. .................. 400/681 |

* cited by examiner

*Primary Examiner*—Khiem Nguyen
(74) *Attorney, Agent, or Firm*—Quintero Law Office

(57) ABSTRACT

A display. The display includes a base, a body, and an elastomer. The base includes a frame thereon. The body is rotatably connected to the frame in such a manner that the body can move between a first position and a second position. The body includes a gear element. The gear element includes a plurality of first protrusions and a plurality of first notchess. The elastomer is disposed on the frame and abuts the elastomer. When the body is in the first position, the elastomer is pressed and abuts at least one of first protrusions. When the body is in the second position, the elastomer is engaged with at least one of first notchess.

10 Claims, 8 Drawing Sheets

DISPLAY

BACKGROUND OF THE INVENTION

1. Field of the Invention

The invention relates to a display, and in particular, to a display with a rotatable adjusting mechanism.

2. Description of the Related Art

FIG. 1 is a conventional liquid crystal display 1 comprising a body 2, a frame 3 and a hinge 4. The body 2 abuts the frame 3 via the hinge 4, so that the body 2 is rotatable relative to the frame 4 for adjusting the viewing angle of the liquid crystal display 1. The body 2 is securely connected to the frame 3 and supported by the frame 3. Thus, relative rotation between the body 2 and the frame 3 is difficult. Furthermore, the angle of the rotation cannot be fixed at a particular angle.

BRIEF SUMMARY OF THE INVENTION

The invention provides a display with a gear element and an elastomer, which can easily adjust the visual angle of a display.

Accordingly, an exemplary embodiment of a display comprises a base, a body, and an elastomer. The display comprises a base, a body, and an elastomer. The base comprises a frame thereon. The body is rotatably connected to the frame in such a manner that the body can move between a first position and a second position. The body comprises a gear element. The gear element comprises a plurality of first protrusions and a plurality of first notches. The elastomer is disposed on the frame and abuts the elastomer. When the body is in the first position, the elastomer is compressed and abuts at least one of the first protrusions. When the body is in the second position, the elastomer is engaged with at least one of the first notches.

The elastomer further comprises a plurality of second protrusions and a plurality of second notches. When the body is in the first position, the elastomer is compressed and the second protrusions abut the first protrusions. When the body is in the second position, the elastomer returns to its original position and the second protrusions are engaged with the first notches.

The frame further comprises a receiving part and the receiving part comprises a curved edge. The elastomer is disposed in the curved edge. The receiving part further comprises a plurality of movable pins which can be moved between a third position and a fourth position. When the movable pins are in the third position, the body is rotatable. Otherwise, when the movable pins are in the fourth position, the movable pins are engaged with at least one of the first notches.

The display further comprises a plurality of elastic elements. The elastic elements are disposed on the frame and connected with the movable pins, thus, the movable pins can return to the third position. The frame further comprises a plurality of openings. The movable pins are respectively disposed in and exposed outside the openings. The receiving part further comprises a plurality of fixed elements disposed in the curved edge connecting with the elastic elements.

The gear element and the body are integrally formed. The gear element is disposed on the body by melting or screws. The display further comprises a revolving shaft. The revolving shaft passes through the gear element and the center of the frame. Thus, the gear element rotates around the revolving shaft.

Another exemplary embodiment of a display comprises a base, a body, an elastomer, and a plurality of movable pins. The base comprises a frame. The body comprises an adjusting element connected to the frame. The elastomer is disposed on the frame and abuts the adjusting element. The movable pins are movably disposed on the frame in such a manner that the movable pins can move between a first position and a second position. When the movable pins are in the first position, the movable pins are separated from the adjusting element. When the movable pins are in the second position, the movable pins are engaged with the adjusting element so that the body can be fixed on the frame.

The display further comprises a plurality of elastic elements, which is disposed on the frame, and respectively being connected with the movable pins to return the movable pins to the first position. Particularly, the elastic elements are compression springs.

Furthermore, the movable pins respectively comprise a notch and the adjusting element comprises a plurality of fixed elements. When the movable pins are in the second position, the fixed elements are engaged in the notches. When the movable pins are in the first position, the fixed elements are separated from the notches. Additionally, the fixed elements respectively comprise a first inclined plane and the notches respectively comprise a second inclined plane. When the movable pins are in the second position, the first inclined plane abuts against the second inclined plane. Moreover, each adjusting element comprises a plurality of openings. The fixed elements are respectively disposed on the openings, which can be exposed outside the openings.

The display further comprises a plurality of elastic elements. The elastic elements are respectively connected with the fixed elements so that the fixed elements return to the engaged position with the movable pins.

Note that the gear elements are compression springs disposed on the body by melting or screws. Furthermore, the gear elements and the body are integrally formed. The frame comprises a plurality of openings. The movable pins are respectively disposed in the openings. The display further comprises a revolving shaft. The revolving shaft passes through the gear element and the center of the frame so that the gear element rotates around the revolving shaft.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF TABLE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
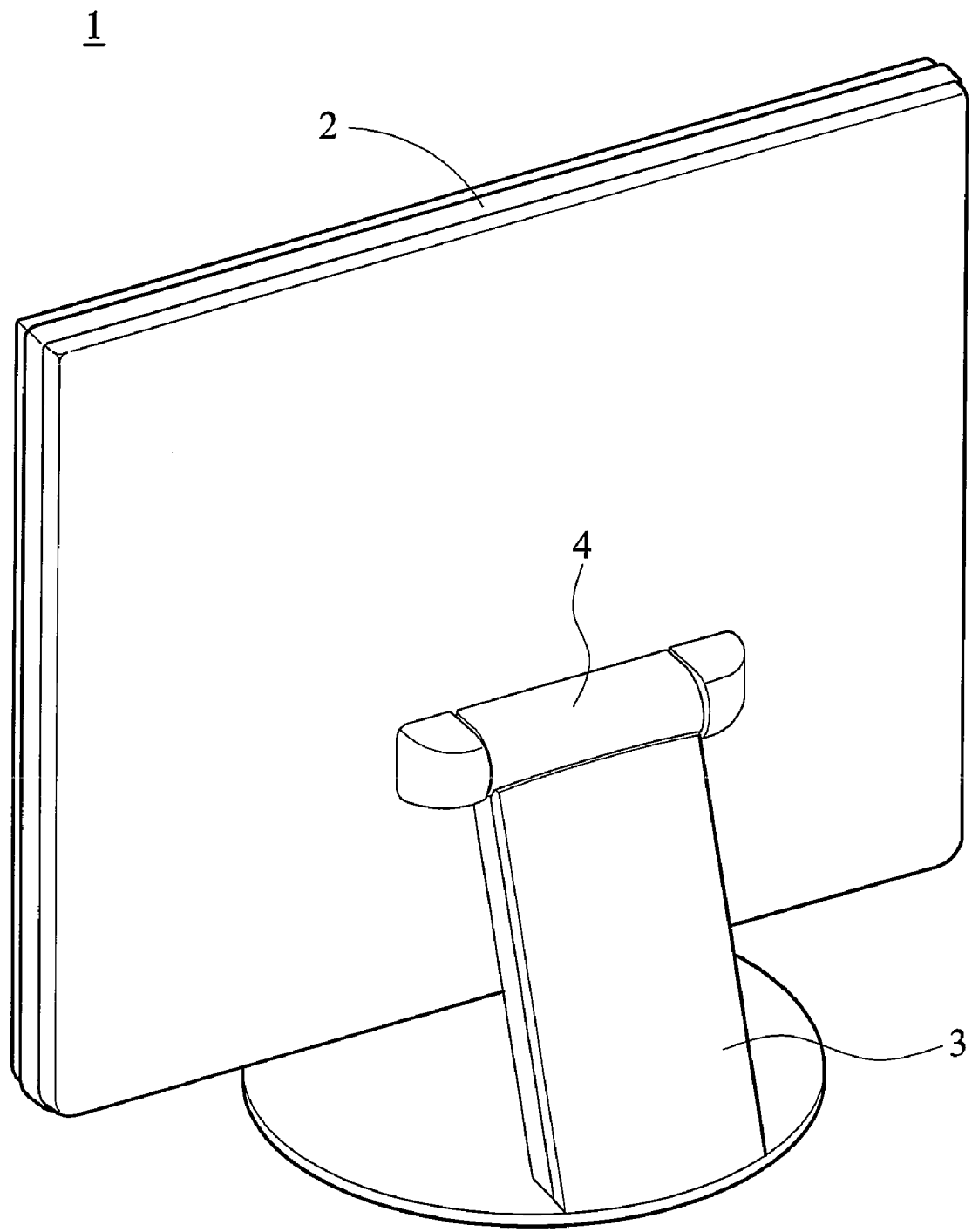
FIG. 1 is a schematic view of a conventional display.
Figure 2:
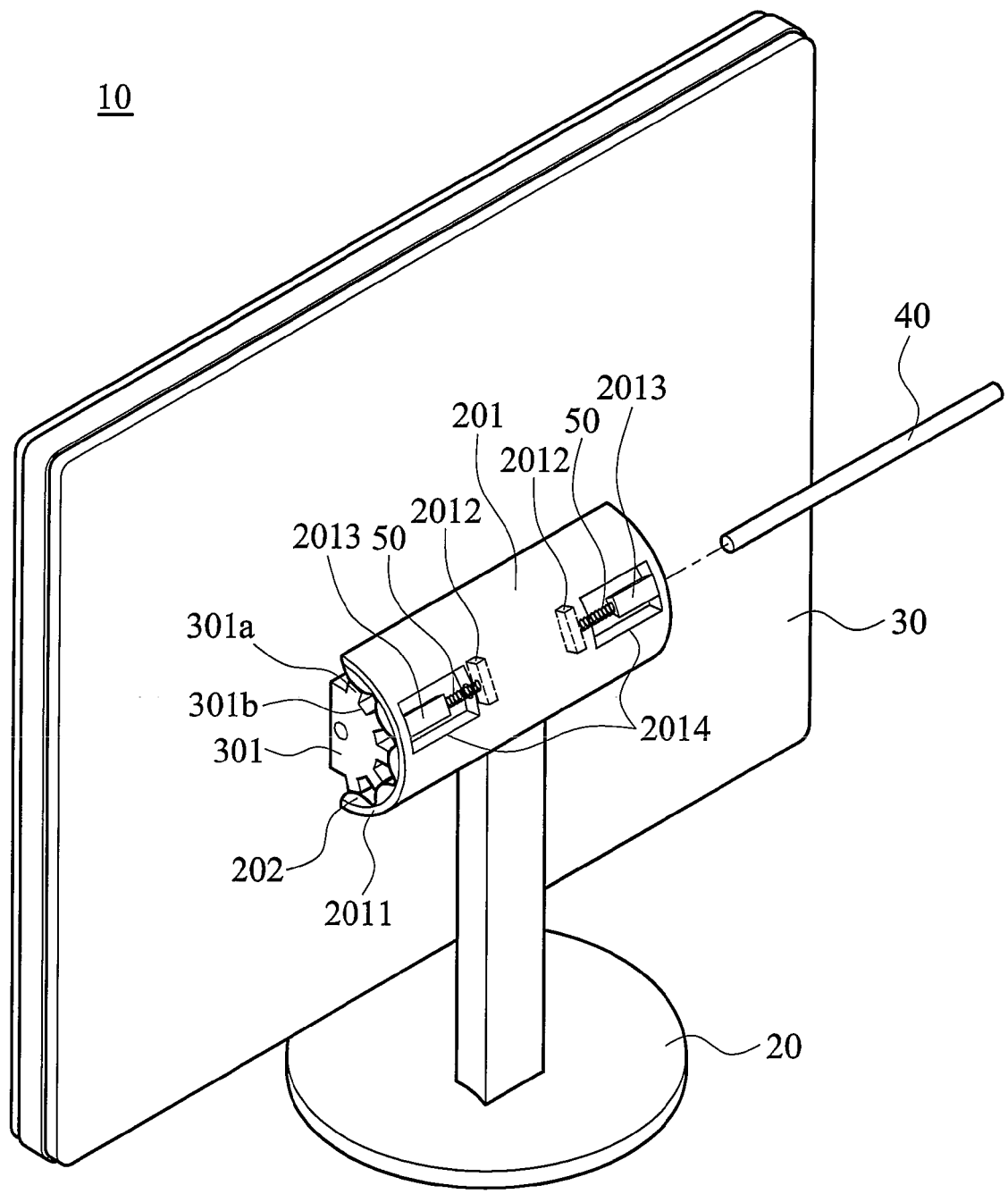
FIG. 2 is a schematic view of a first embodiment of a display.
Figure 3:
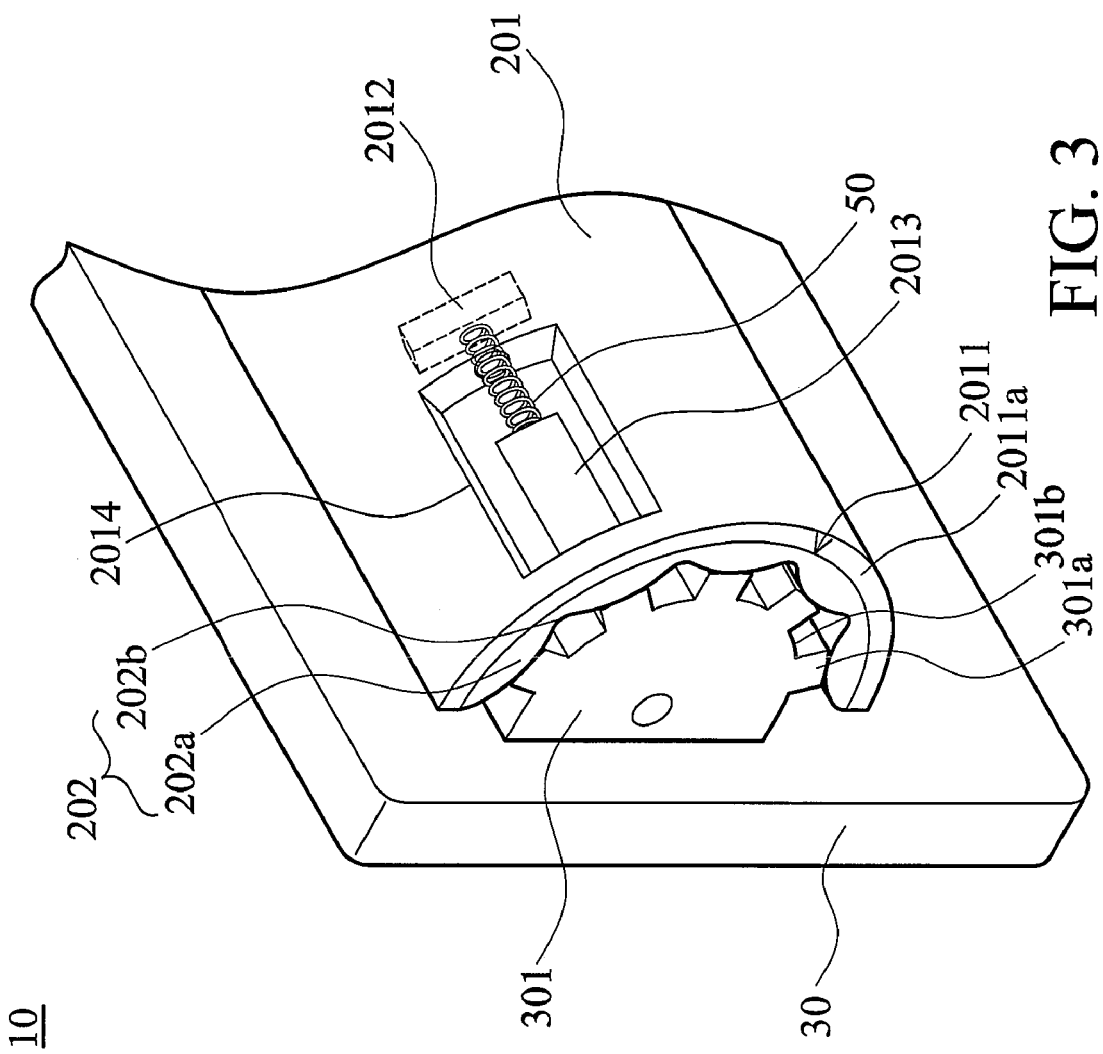
FIG. 3 is another schematic view of the display in FIG. 2, wherein a body is in a first position.
Figure 4:
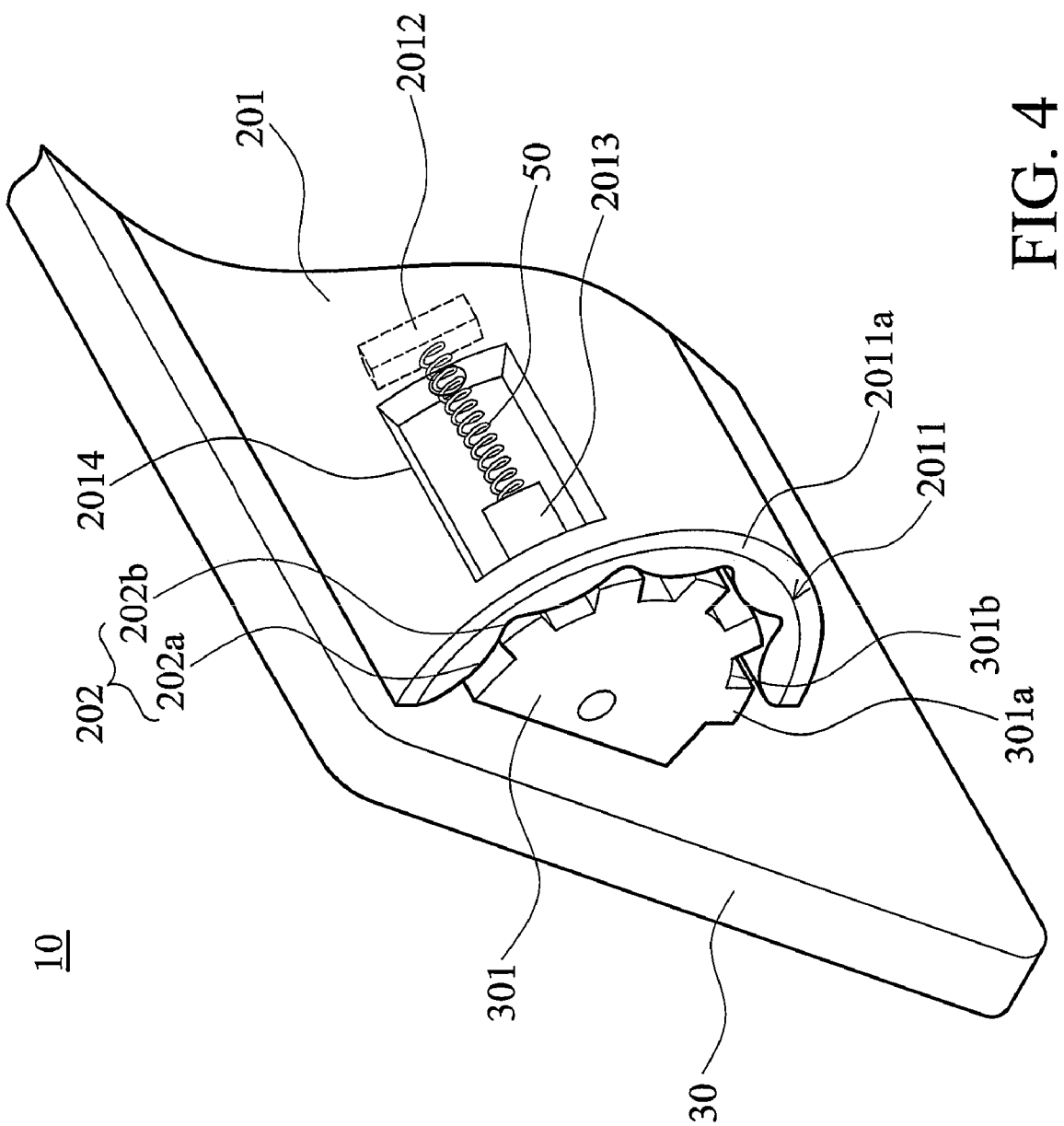
FIG. 4 is another schematic view of the display in FIG. 2, wherein the body is in a second position.

Referring to FIG. 2, a first embodiment of a display 10 comprises a base 20, a body 30, an elastomer 202, a revolving shaft 40, and two elastic elements 50. The base 20 comprises a frame 201. The body 30 is rotatably connected with a frame 201 in such a manner that the body 30 can move between a rotatable position (first position, as shown in FIG. 3) and an engaged position (second position, as shown in FIG. 4). The elastomer 202 and the elastic elements 50 are disposed on the frame 201.

The body 30 comprises a gear element 301. The gear element 301 comprises a plurality of first protrusions 301a and a plurality of first notches 301b. The frame 201 of the base 20 comprises a receiving part 2011, two fixed elements 2012, two movable pins 2013, and two openings 2014. The receiving part 2011 comprises a curved edge 2011a. The elastomer 202 and the fixed elements 2012 are disposed in the curved edge 2011a. The elastomer 202 abuts against the gear element 301. The fixed elements 2012 are connected with the elastic elements 50. The movable pins 2013 are moved between an original position (third position, as shown in FIG. 3) and a proceeding position (fourth position, as shown in FIG. 4), and are exposed outside the openings 2014.

The elastomer 202 further comprises a plurality of second protrusions 202a and a plurality of second notches 202b, as shown in FIG. 3. Additionally, referring to FIG. 2, the revolving shaft 40 passes through the gear element 301 and the center of the frame 201. Thus, when the body 30 rotates, the gear element 301 of the body 30 rotates relatively around the revolving shaft 40.

Referring to FIG. 3, when the body 30 is in the first position and the movable pins 2013 are in the third position, the second protrusions 202a are compressed by the first protrusions 301a and the second notches 202b are opposite to the first notches 301b, furthermore, the body 30 can freely rotate to adjust the angle. When the body 30 has been rotated to the second position and the movable pins 2013 are still in the third position, the body 30 still can rotate to adjust the angle.

Referring to FIG. 4, when the body 30 has been rotated to the needed angle, the body 30 is in the second position. Furthermore, the movable pins 2013 are moved to the fourth position from the third position. At that time, the second protrusions 202a and the movable pins 2013 are engaged with the second notches 202b. Thus, the body 30 is fixed in the position after adjustment. When the body 30 is moved to the first position from the second position, the elastic elements 50 connected with the movable pins 2013 can return the movable pins 2013 back to the third position.

Referring to FIG. 3 again, when the display 10 is not used, the body 30 is in the first position and the movable pins 2013 are in the third position. When the angle of the display 10 is adjusted, the body 30 is rotated to the needed angle and the body 30 is moved to the second position from the first position, thus, the second protrusions 202a are engaged with the second notches 202b. The movable pins 2013 are subsequently moved to the fourth position so that the movable pins 2013 are engaged with the second notches 202b. Consequently, the body 30 can be fixed at a particular angle.

Note that the gear element 301 and the body 30 can be integrally formed, but can also be disposed on the body 30 by melting and screws. Further, it is noted that the number of the first protrusions 301a, the first notches 301b, the second protrusions 202a and the second notches 202b are not limited to those depicted in FIG. 2 and FIG. 4, which can be increased or reduced depending on requirements.

In conclusion, the display 10 of the first embodiment provides a gear element 301 and the special design of the frame 201, which is convenient for user to adjust the angle of the display 10. Furthermore, when the number of the first protrusions 301a and the second protrusions 202a is greater, the required angle can be more accurate.

Second Embodiment

Figure 5:
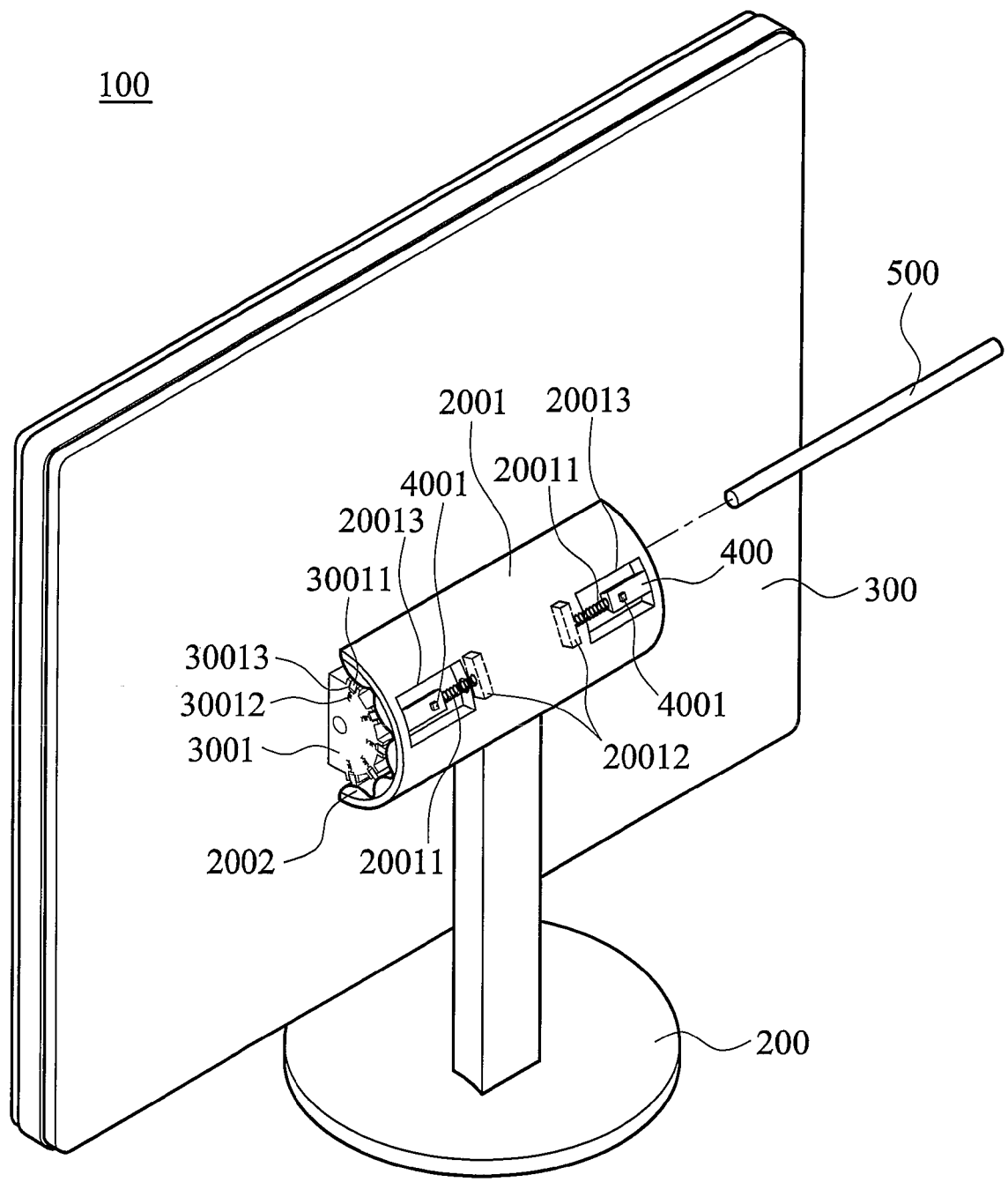
FIG. 5 is a schematic view of a second embodiment of a display.

Referring to FIG. 5, a second embodiment of a display 100 comprises a base 200, a body 300, an adjusting element 3001, an elastomer 2002, and two movable pins 400. The adjusting element 3001 is disposed on the body 300. The base 200 comprises a frame 2001. The frame 2001 is connected with the adjusting element 3001. The elastomer 2002 is disposed in the frame 2001 and abuts the adjusting element 3001. The movable pins 400 are movably disposed on the frame 2001 in such a manner that the movable pins 400 are moved between a separated position (first position, as shown in FIG. 6) and an engaged position (second position, as shown in FIG. 7).

Referring to FIG. 5, the frame 2001 comprises two first elastic elements 20011, two fixed elements 20012, and two openings 20013. The first elastic elements 20011 are respectively connected with the movable pins 400. The fixed elements 20012 are connected with the first elastic elements 20011 and the movable pins 400 are respectively disposed in the openings 20013.

Figure 6:
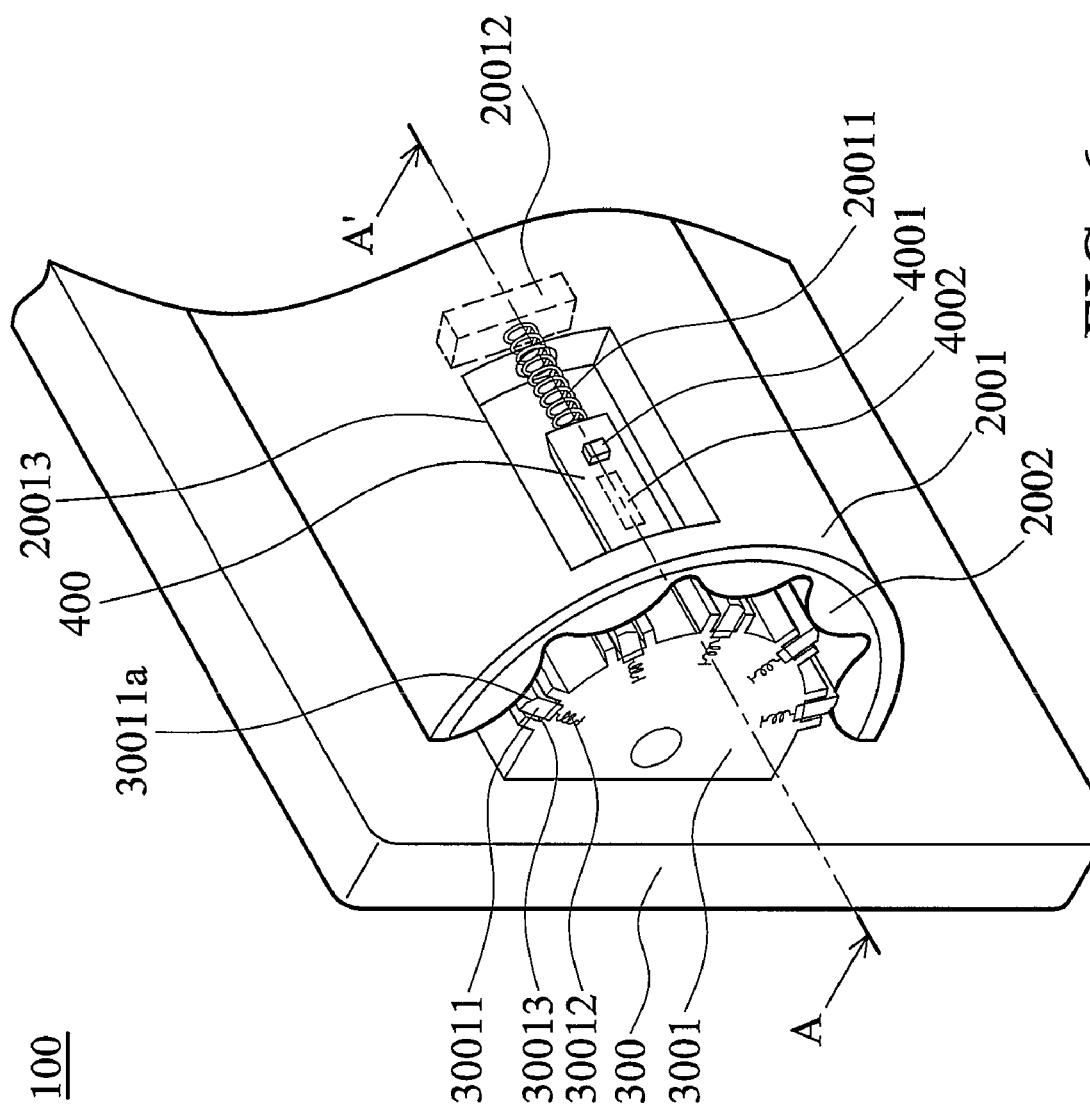
FIG. 6 is another schematic view of the display in FIG. 5, wherein movable pins are in a first position.
Figure 7:
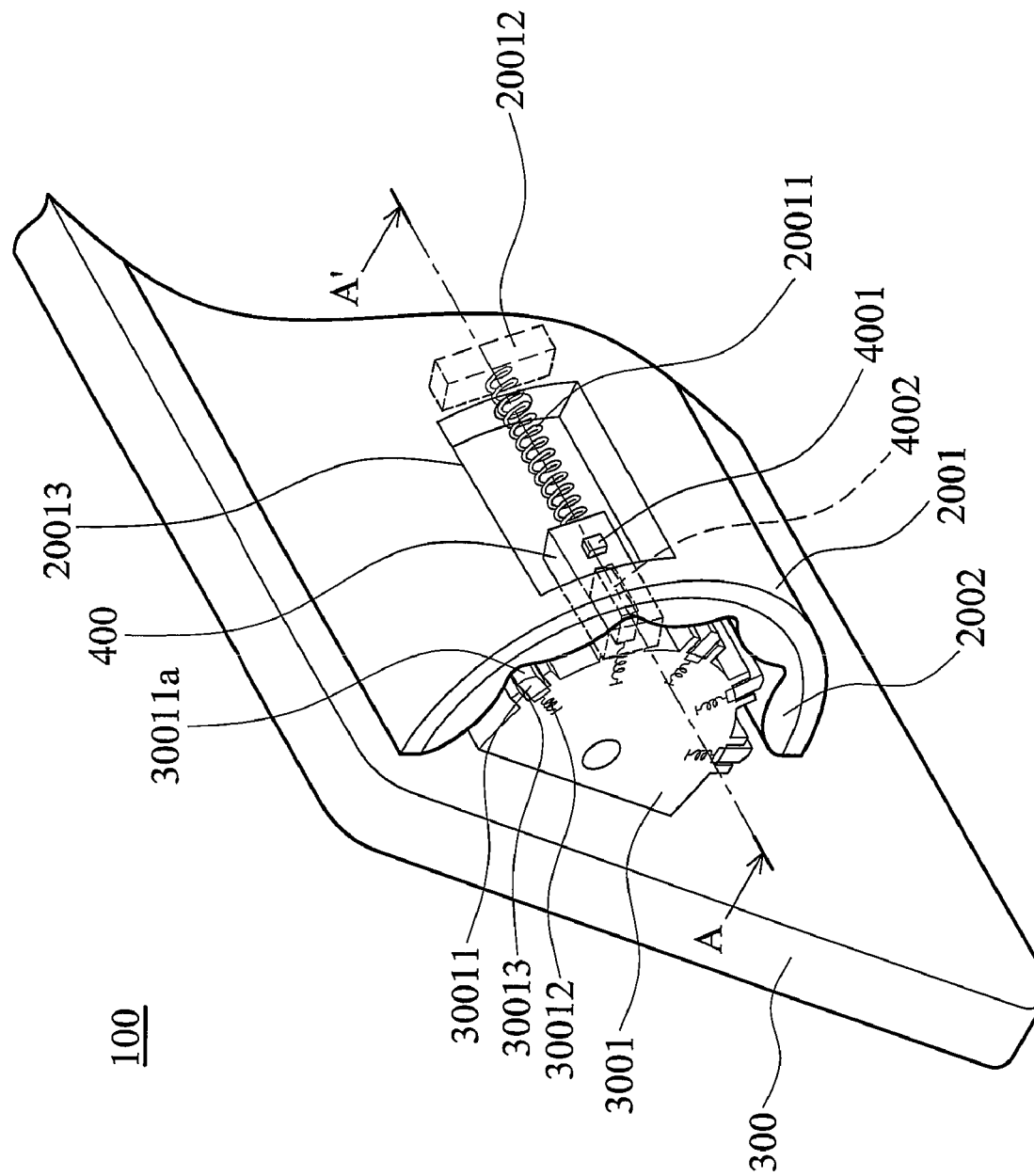
FIG. 7 is another schematic view of the display in FIG. 5, wherein the movable pins are in a second position.
Figure 8:
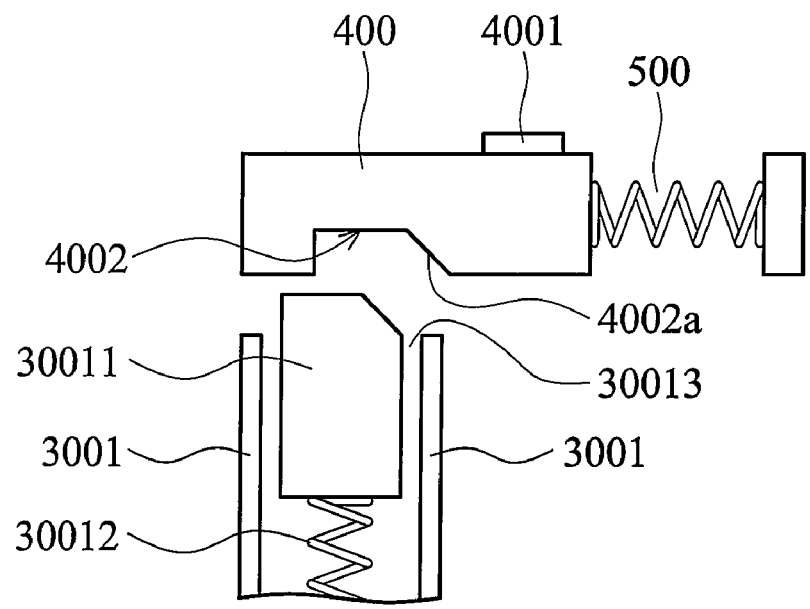
FIG. 8 is a sectional view along line A-A' in FIG. 6, wherein only the movable pins and orientated elements are shown.

Referring to FIG. 6, the adjusting element 3001 comprises a plurality of orientated elements 30011, a plurality of second elastic elements 30012, and a plurality of openings 30013. The orientated elements 30011, which comprise a first inclined plane 30011a, are respectively disposed in the openings 30013 and are exposed outside the openings 30013. The second elastic elements 30012 are respectively connected with the orientated elements 30011. Furthermore, each movable pin 400 comprises a button 4001 and a notch 4002. The button 4001 can easily move the movable pin 400. Referring to FIG. 8, one of the notches 4002 is disposed opposite one of the orientated elements 30011, and each notch 4002 comprises a second inclined plane 4002a.

Figure 9:
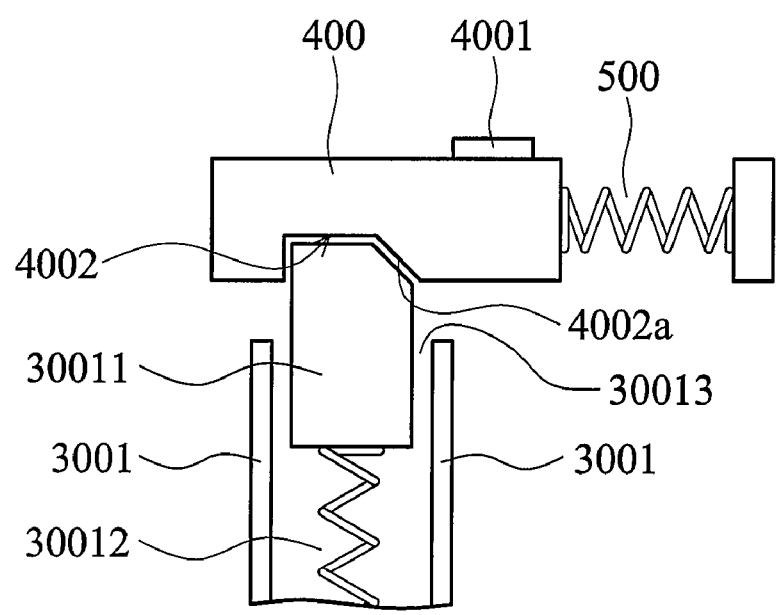
FIG. 9 is a sectional view along line A-A' in FIG. 7, wherein only the movable pins and orientated elements are shown.

Referring to FIG. 6 and FIG. 8, when the movable pins 400 are in the first position, the orientated elements 30011 of the adjusting elements 3001 are separated from the notches 4002 of the movable pins 400 so that the body 300 can freely rotate. At the same time, the second elastic elements 30012, which are connected with the orientated elements 30011, are compressed. Referring to FIG. 7 and FIG. 9, when the movable pins 400 are moved to the second position, the orientated elements 30011 of the adjusting elements 3001 are moved upward by the elastic force provided by the second elastic elements 30012 and the orientated elements 30011 are then engaged with the notches 4002 of the movable pins 400, thus, the first inclined planes 30011a of the orientated elements 30011 respectively abut the second inclined planes 4002a of the notches 4002 and the first elastic elements 20011 are extended. When the movable pins 400 leave from the second position, the notches 4002 of the movable pins 400 and the orientated elements 30011 are separated, and the movable pins 400 return to the first position by elastic force of the first elastic elements 20011.

When the display 100 is used, the body 300 is moved to required angle, thus, the adjusting elements 3001 and the frame 2001 are relatively rotated. The elastomer 2002 can aid in the rotation and the orientation of the body 300. When the movable pins 400 are in the first position, the orientated elements 30011 of the adjusting elements 3001 are separated from the notches 4002 of the movable pins 400. When the body 300 is rotated positioning the notches 4002 of the movable pins 400 opposite to the orientated elements 30011, the movable pins 400 are moved to the second position so that the second inclined planes 4002a of the notches 4002 are respectively engaged with the first inclined planes 30011a of the orientated elements 30011. Thus, the body 300 is fixed at the particular angle. At the same time, the first elastic elements 20011 connected with the movable pins 400 can be extended. When rotating the body 300 to another angle, the movable pins 400 are pulled toward the inverse direction of the orientated elements 30011, and the inclined force from the second inclined planes 4002a pushes the first inclined planes 30011a so that the orientated elements 30011 are pushed downward. Thus, the second elastic elements 30012, which are connected to the orientated elements 3001, are compressed. At the same time, the notches 4002 of the movable pins 400 are separated from the orientated elements 30011. Additionally, the movable pins 400 can return to the first position by the elastic force of the first elastic elements 20011. The display 100 further comprises a revolving shaft 500, which passes through the adjusting elements 3002 and the center of the frame 2001, thus, the adjusting elements 3002 can be rotated around the revolving shaft 500.

In conclusion, in the second embodiment of the display 100, the inclined angle can be more easily adjusted by the user, and the elastic elements are used to automatic orientation. Thus, the invention is more useful than the hinge of a conventional display.

Note that the first elastic elements 20011 and the second elastic elements 30012 are compression springs. Furthermore, note that the adjusting elements 3001 are disposed on the body 300 by melting or screws, or can be integrally formed with the body 300.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
   a base comprising a frame;
   a body rotatably connected to the frame the body moving between a first position and a second position, wherein the body comprises a gear element and the gear element comprises a plurality of first protrusions and a plurality of first notches; and
   an elastomer disposed on the frame, abutting the gear element;
   wherein when the body is in the first position, the elastomer is compressed and abuts at least one of first protrusion; when the body is in the second position, the elastomer is engaged with at least one of the first notches.

2. The display as claimed in claim 1, wherein the elastomer further comprises a plurality of second protrusions and a plurality of second notches, when the body is in the first position, the elastomer is compressed and the second protrusions abut the first protrusions, and when the body is in the second position, the elastomer is returned and the second protrusions are engaged with the first notches.

3. The display as claimed in claim 1, wherein the frame comprises a receiving part and the receiving part comprises a curved edge, and the elastomer is disposed in the curved edge.

4. The display as claimed in claim 3, wherein the receiving part further comprises a plurality of movable pins, which are moved between a third position and a fourth position, when the movable pins are in the third position, the body is rotatable, and when the movable pins are in the fourth position, the movable pins are engaged with at least one of the first notches.

5. The display as claimed in claim 4, further comprising a plurality of elastic elements disposed on the frame, and connecting respectively with the movable pins, to return the movable pins to the third position.

6. The display as claimed in claim 5, wherein the frame further comprises a plurality of openings, the moving pins are respectively disposed in the openings and are exposed outside the openings.

7. The display as claimed in claim 5, wherein the receiving part further comprises a plurality of fixed elements, and the fixed elements are disposed in the curved edge and are connected with the elastic elements.

8. The display as claimed in claim 1, wherein the gear element and the body are integrally formed.

9. The display as claimed in claim 1, wherein the gear element is disposed on the body by hot melting or screws.

10. The display as claimed in claim 1, further comprising a revolving shaft, wherein the revolving shaft passes through the gear element and the center of the frame so that the gear element rotates around the revolving shaft.

* * * * *